UNITED STATES PATENT OFFICE.

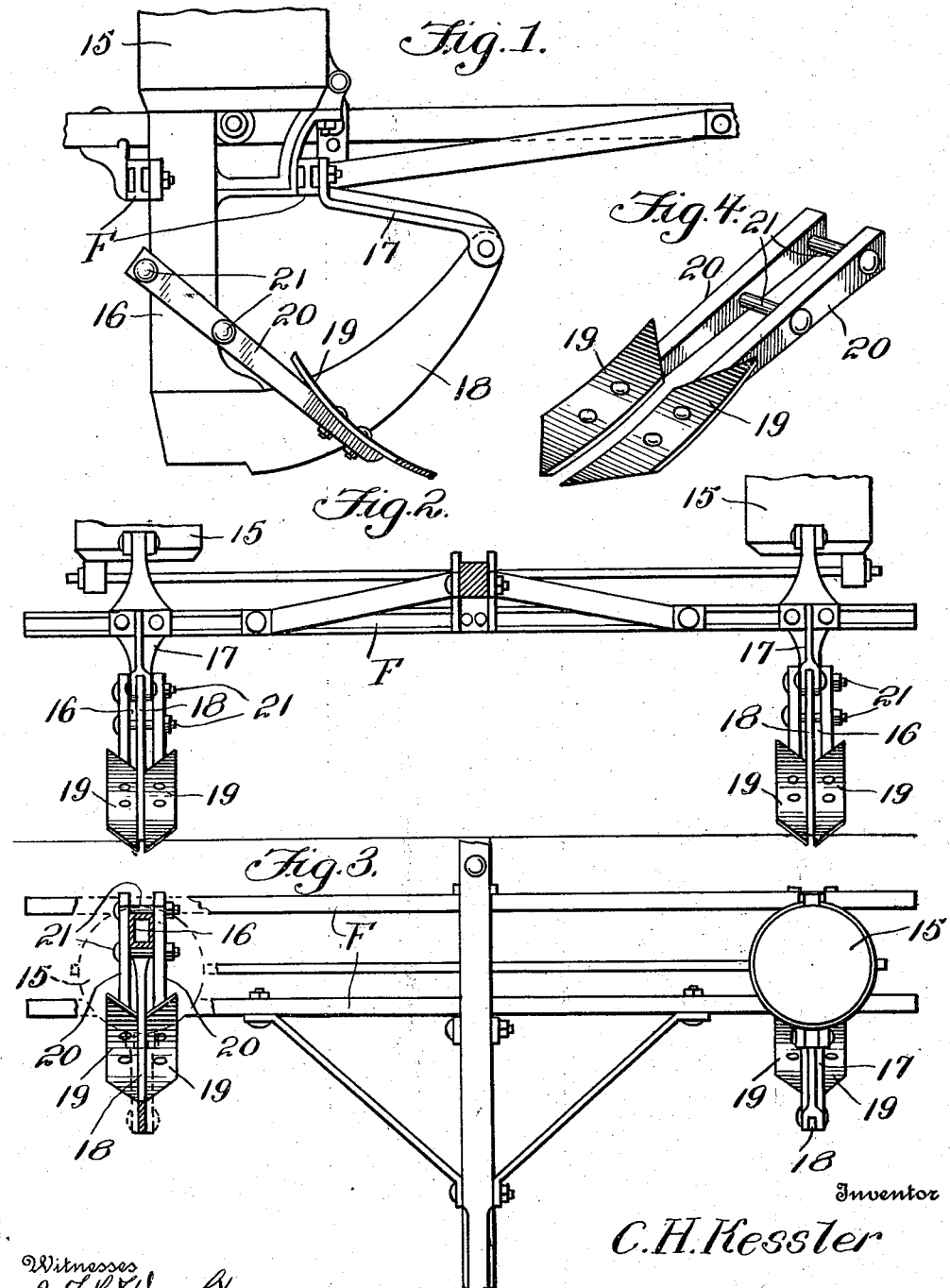

CHARLES H. KESSLER, OF HARRISONVILLE, MISSOURI.

CORN-PLANTER.

1,217,011.  Specification of Letters Patent.  Patented Feb. 20, 1917.

Application filed June 9, 1916. Serial No. 102,761.

*To all whom it may concern:*

Be it known that I, CHARLES H. KESSLER, a citizen of the United States, residing at Harrisonville, in the county of Cass and State of Missouri, have invented new and useful Improvements in Corn-Planters, of which the following is a specification.

This invention relates to corn planters, and it has particular reference to an improved furrow opening attachment.

In corn planters as ordinarily constructed the shoe is usually formed with rearwardly divergent wings whereby, when the shoe enters the ground the soil is displaced laterally to form a furrow. It often happens that the soil settles back in the furrow beneath the charge of seed, the result being that the seed will not be deposited at the proper depth.

The present invention has for its object to produce a simple and effective furrow opening device whereby the soil will be lifted from the furrow and deposited adjacent to the two sides of the furrow, leaving a clean cut furrow to receive the seed.

A further object of the invention is to produce a furrow opening device comprising twin blades supported adjacent to opposite sides of the shoe or runner and coöperating with the latter to form a furrow.

A further object of the invention is to produce simple and effective means for supporting the twin blades in such a manner as to enable adjustment of said blades to be conveniently accomplished.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—

Figure 1 is a side view of the runner frame of the corn planter to which the invention has been applied.

Fig. 2 is a front view of the same.

Fig. 3 is a top plan view, a portion of the runner frame having been broken away.

Fig. 4 is a perspective detail view of the twin blades and the standards carrying the same.

Corresponding parts in the several figures are denoted by like characters of reference.

The runner frame F, which is of conventional construction, supports the seed boxes 15 and the discharge tubes or "boots" 16, as they are commonly designated. The side members 17 of the runner frame are connected with the boots by the runners 18 which consist of flat blades.

The twin blades or furrow openers 19 are supported adjacent to both sides of each runner by standards 20 which abut on opposite sides of the boot 16, the standards being connected together adjacent to the front and rear faces of the boot by means of clamp bolts 21. The twin blades are substantially diamond shape, as shown, having inner straight edges that engage the side faces of the runner. By tightening the clamp bolts the standards carrying the twin blades may be secured in various positions on the boot, thereby arranging the twin blades in the desired position, longitudinally and vertically with respect to the runner.

It will be obvious that in the operation of this invention, the twin blades will coöperate with the runner to form a groove or furrow of the desired depth for the reception of seed. It is also obvious that the depth of the groove may be readily controlled by proper adjustment of the twin blades with respect to the runners.

While the invention has been described as being applicable to a corn planter, it is to be understood that it is capable of being applied to and successfully used in connection with planters for planting beans, peas and other seeds that are planted in rows.

Having thus described the invention, what is claimed as new, is:—

A runner frame, a seed tube carried thereby, a runner consisting of a flat blade connected with the seed tube and extending upwardly and forwardly with respect thereto, standards supported adjacent to the two side faces of the seed tube and extending downwardly and forwardly adjacent to and spaced from the side faces of the runner, earth engaging blades carried by the standards in engagement with the side faces of the runner, and clamp bolts extending through the standards in front and in rear of the seed tube to clamp said standards securely on the tube with the inner edges of the blades in engagement with the side faces of the runner.

In testimony whereof I affix my signature.

CHAS. H. KESSLER.